(No Model.)
J. A. JONES.
MACHINE FOR ASSORTING AND SIZING FRUITS, &c.
No. 442,288. Patented Dec. 9, 1890.
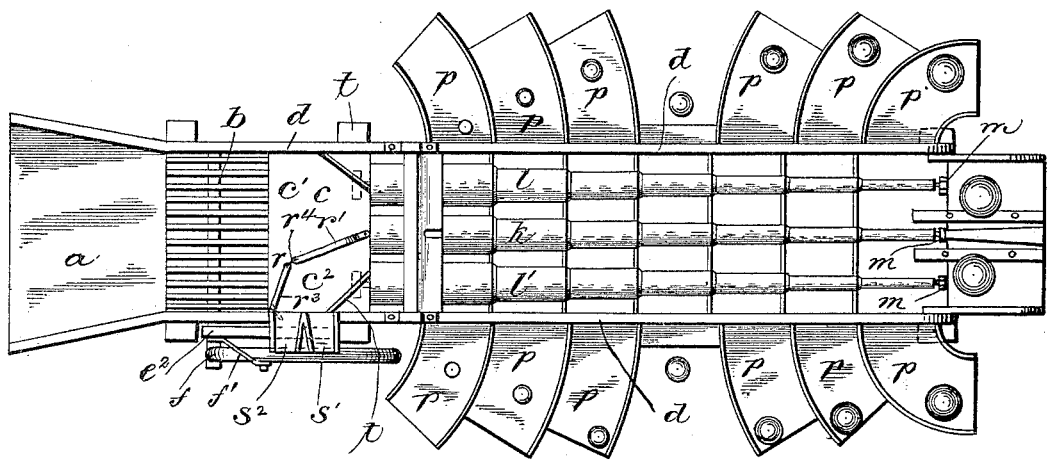
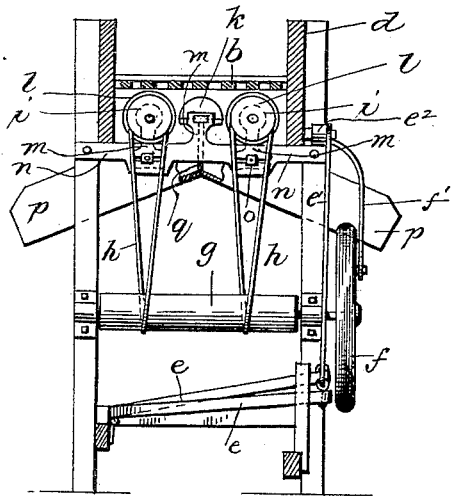
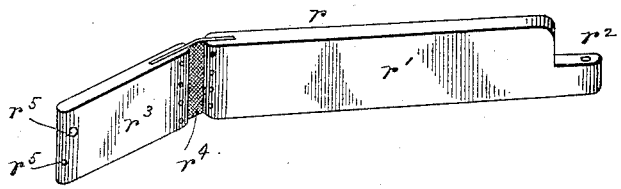
WITNESSES
INVENTOR

UNITED STATES PATENT OFFICE.

JOHN A. JONES, OF YORK, PENNSYLVANIA.

MACHINE FOR ASSORTING AND SIZING FRUITS, &c.

SPECIFICATION forming part of Letters Patent No. 442,288, dated December 9, 1890.

Application filed June 24, 1890. Serial No. 356,542. (No model.)

*To all whom it may concern:*

Be it known that I, JOHN A. JONES, a citizen of the United States, residing at York, in the county of York and State of Pennsylvania, have invented a certain new and useful Improvement in Machines for Assorting and Sizing Fruits, &c., of which the following is a full, clear, and exact description.

"Sizing" fruit in the nomenclature of the horticulturist means to separate fruit into lots, all of the fruit in each lot being essentially of the same dimensions or size. In the same nomenclature "assorting" fruit means separating the fruit according to its quality or color or other distinguishing characteristics without reference especially to size or dimensions.

The present invention relates to a machine primarily designed for sizing fruit, and also to a machine in which both sizing and assorting may be accomplished.

The invention consists of a machine of the character described, in which the working members are constructed and arranged to operate in the manner and for the purpose hereinafter more particularly set forth and finally claimed.

In the accompanying drawings, illustrating my invention, in the several figures of which like parts are similarly designated, Figure 1 is a plan which illustrates both a sizing and an assorting machine. Fig. 2 is a sectional end view, and Fig. 3 is a perspective view, of a detachable assorting-board.

The hopper $a$, slatted leaf-separating portion $b$, working-compartment $c$, frame or trough $d$, treadles $e$, pitmen $e'$, by which said treadles are connected to opposite ends of a rocking lever $e^2$, secured to the working-compartment, fly-wheel $f$, and connecting-rod $f'$, for connecting the rocking lever and fly-wheel, belt-drum $g$, belts $h$, and pulleys $i$, by which the belts are applied to the separating devices, may be of any approved construction. (See, for example, my patent, No. 430,031, dated June 10, 1890.)

In the machine that is designed solely for sizing I will employ a stationary member $k$ and a rotary member $l$. These two members are provided with a series of graduations. The edge of each graduated section is straight and the adjacent edges of these graduated members are parallel, so that the openings between the two members are rectangular. The stationary member may be cylindrical or semi-cylindrical or other section of a cylinder, or it may be angular. The rotary member, of course, is, of necessity, cylindrical. When but these two members are employed, the driving mechanism will be modified accordingly. The rotary member may be arranged in brackets $m$ at opposite ends of the machine, and these brackets may be supported upon cross-bars $n$, slotted longitudinally, and the brackets adjustably secured to such slotted portions by means of a bolt and nut or other suitable fastening $o$, so that the said member may be adjusted bodily toward and from the member $k$ to vary the sizes of the openings between these two members, all as in my patent, No. 430,031, referred to. Of course the member $k$ may be made adjustable instead of the member $l$. As many spouts $p$ will project from the bottom of the trough laterally as there are exits in the separating members.

In the machine shown in Fig. 1 there is a stationary center piece $k$, graduated as before, and two parallel correspondingly-graduated side pieces $l$ and $l'$, arranged on opposite sides of this said center piece, and the discharge-spouts project from opposite sides of the trough. Beneath the center piece, as shown in Fig. 2, there is a vertical partition $q$, which separates the spouts of one side from those of the other. Such a machine is equally efficient as the one first described for sizing fruit. In order to render it capable of assorting as well as sizing, I arrange in the compartment $c$ an assorting-board $r$, (shown in detail in Fig. 3 as consisting of portion $r'$,) having at one end a socket $r^2$ to receive a screw or other fastening, whereby the said board may be attached in place in the compartment $c$, as indicated in Fig. 1. A movable portion $r^3$ is secured to the portion $r'$, preferably by a hinge $r^4$ of textile material, and the said portion $r^3$ is provided with screw-holes or other openings $r^5$, by which the said portion may be secured to one or the other side of the trough. When this assorting-board $r$ is arranged in the compartment $c$, as shown in Fig. 1, the feed may be into the portion $c'$ of the compartment $c$, and the attendant standing by this compartment, in assorting oranges, say, will allow all the "brights" to pass between $l$ and $k$, while he will pick out the "russets" and place them in the section $c^2$, so that they may pass between the members $k$ and $l'$. In this way the brights will all be discharged from one side of the machine and the russets from the other. A spout $s$ may be attached to the side of the trough and have two divisions, one of which $s'$ may serve to conduct away faulty fruit, while the other $s^2$ may serve to receive from the attendant "golden russets."

The compartment $c$ may receive oblique boards $t\ t$ on opposite sides to insure the fruit rolling down between the members $k$ and $l$ and $k$ and $l'$.

The assorting-board is removable from the compartment $c$ at pleasure when fruit is being separated that needs no assorting. This assorting-board is articulated, in order that the machine may be used for right or left hand overseeing.

What I claim is—

1. In a fruit sizing and assorting machine, suitable separating members, substantially such as set forth, a hopper, and an assorting-board arranged obliquely in the said hopper and removable therefrom at pleasure, substantially as described.

2. An articulated assorting-board, combined with the separating devices and hopper of a fruit-sizing machine, substantially in the manner and for the purpose set forth.

3. A machine for sizing and assorting fruit, consisting of a stationary graduated member and a rotary graduated member arranged upon each side of the said stationary member, the said several members being graduated alike and the graduations forming a series of exits of different width and rectangular in outline, discharge-spouts leading from said exits, and a partition $q$, arranged beneath the stationary member and lengthwise thereof and separating the said discharge-spouts in the line of the stationary member, and thereby constituting a machine adapted to separate two different kinds or qualities of fruit, substantially as described.

In testimony whereof I have hereunto set my hand this 23d day of June, A. D. 1890.

JOHN A. JONES.

Witnesses:
J. JESSOP,
W. T. NELSON.